United States Patent [19]

Tiedje

[11] Patent Number: 5,740,189
[45] Date of Patent: Apr. 14, 1998

[54] INTEGRITY CHECK METHOD AND SYSTEM FOR SERIAL-BASED COMMUNICATION

[75] Inventor: Kevin Mark Tiedje, Farmington Hills, Mich.

[73] Assignee: Ford Motor Company, Dearborn, Mich.

[21] Appl. No.: 725,042

[22] Filed: Oct. 3, 1996

[51] Int. Cl.$^6$ .......................... G06F 11/10; H03F 13/00
[52] U.S. Cl. .................... 371/53; 371/37.01; 371/34; 371/48; 371/20.1; 371/241; 371/242; 371/248; 371/249
[58] Field of Search ................. 371/53, 48, 20.1, 371/37.01, 20.5, 49.1, 54, 34; 370/241, 242, 248, 249

[56] References Cited

U.S. PATENT DOCUMENTS

| | | | |
|---|---|---|---|
| 4,177,447 | 12/1979 | Jaouen | 340/146.1 |
| 4,534,025 | 8/1985 | Floyd | 370/85 |
| 4,866,609 | 9/1989 | Calta et al. | 364/200 |
| 5,390,197 | 2/1995 | MacDonald et al. | 371/37.01 |
| 5,412,651 | 5/1995 | Gorshe | 370/85.9 |
| 5,506,958 | 4/1996 | Myran | 395/182.16 |

*Primary Examiner*—Phung M. Chung
*Attorney, Agent, or Firm*—Paul K. Godwin; Roger L. May

[57] ABSTRACT

A method is provided for checking the integrity of a full duplex multi-word serial transfer between first and second devices, the transfer including an actual last word. The method includes transmitting a count word from the first device to the second device, the count word indicating a number of words to be transmitted including an expected last word, transmitting the actual last word from the first device to the second device, and transmitting, substantially simultaneously to transmission of the actual last word, a check code word from the second device to the first device, the check code word having a selected value if the actual last word is the expected last word, and another value otherwise. The method also includes determining a transfer error if the value of the check code word is other than the selected value. A system is also provided for performing the method.

20 Claims, 4 Drawing Sheets

INTEGRITY CHECK METHOD AND SYSTEM FOR SERIAL-BASED COMMUNICATION

TECHNICAL FIELD

This invention relates to a method and system for checking the integrity of full duplex serial communications between devices such as master and slave devices.

BACKGROUND ART

One of the advantages of a serial interface between a peripheral device and a host microprocessor is that such an interface uses fewer data and control lines than a parallel interface. However, as serial transactions get longer, the probability of extraneous signal noise corrupting the transaction increases, especially in noisy environments such as automobiles or the like.

It is, therefore, desirable to provide serial data communication protocols with a way to verify the reception of a valid message along with a way to indicate this to the sender. To that end, serial data transfer based protocols have been developed that use check sums transmitted from the host after transmission of a command or other data from the host.

According to such protocols, however, only the peripheral knows if a data transfer error has occurred. In that event, the peripheral must then assert an interrupt requesting service from the host in the form of a re-transmission of the corrupted data. However, in servicing that interrupt request, the host has no way of knowing which command and/or data previously sent to the peripheral is in error. As a result, the host must re-transmit all prior commands and/or data to ensure that the error is corrected. It is, therefore, extremely difficult to design a fault handler that can recover and reissue corrupted transactions, since such transactions may have been initiated from many possible locations.

This problem has been at least partially overcome by U.S. Pat. No. 4,534,025 issued to Floyd ("the Floyd '025 patent"), which is directed to a vehicle multiplex system having protocol/format for secure communication transactions. The protocol employs an acknowledgement field transmitted from the peripheral to the host after transmission of a command or other data from the host to the peripheral. Such a protocol permits both the host and the peripheral to detect a data transfer error.

The protocol of the Floyd '025 patent, however, fails to use full duplex communication. More specifically, according to that protocol, a seven byte transaction includes a three byte command message followed by a three byte reply message to check the integrity of the transaction. As a result, three-sevenths of the bandwidth is wasted on the reply message that implements the integrity check.

Thus, there exists a need for an improved method and system for verifying the integrity of multi-byte transactions in serial communications between devices. Such a method and system would provide instantaneous feedback concerning such integrity while avoiding extra overhead in the transaction in the form of wasted bandwidth. Such a method and system would also provide for immediate recognition of a data transfer error, as well as for identification of the specific data transfer that must be reissued to correct that error.

DISCLOSURE OF THE INVENTION

Accordingly, an object of the present invention is to provide an improved method and system for checking the integrity of full duplex serial communications between devices such as a host device and a peripheral device.

According to the present invention, then, a method is provided for checking the integrity of a full duplex multi-word serial transfer between first and second devices, the transfer including an actual last word. The method comprises transmitting a count word from the first device to the second device, the count word indicating a number of words to be transmitted including an expected last word, transmitting the actual last word from the first device to the second device, and transmitting, substantially simultaneously to transmission of the actual last word, a check code word from the second device to the first device, the check code word having a selected value if the actual last word is the expected last word, and another value otherwise. The method of the present invention further comprises determining a transfer error if the value of the check code word is other than the selected value.

The present invention also provides a system for checking the integrity of a full duplex multi-word serial transfer between first and second devices, the transfer including an actual last word. The system comprises means for transmitting a count word from the first device to the second device, the count word indicating a number of words to be transmitted including an expected last word, means for transmitting the actual last word from the first device to the second device, and means for transmitting, substantially simultaneously to transmission of the actual last word, a check code word from the second device to the first device, the check code word having a selected value if the actual last word is the expected last word, and another value otherwise. The system of the present invention further comprises means for determining a transfer error if the value of the check code word is other than the selected value.

These and other objects, features, and advantages will be readily apparent upon consideration of the following detailed description in conjunction with the accompanying drawings.

BEST MODE FOR CARRYING OUT THE INVENTION

In general, the method and system of the present invention are designed to validate data transfers by supplying a check code at a specific location in the data transferred based on the message content. In so doing, the method and system of the present invention provide instantaneous feedback on the successful transmission and reception of messages transferred, and ensure the integrity of message transfers without additional bandwidth overhead.

More specifically, the method and system of the present invention were developed in order to ensure the integrity of multi-byte transfers when a Serial Peripheral Interface (SPI) is used in electronic modules. To do so, the method and system of the present invention employ a protocol which uses four electrical lines connected between a microprocessor and a peripheral device, and allows data to be sent in both directions between the two devices in the same transaction (i.e., full duplex serial data transfer).

Figure 1:
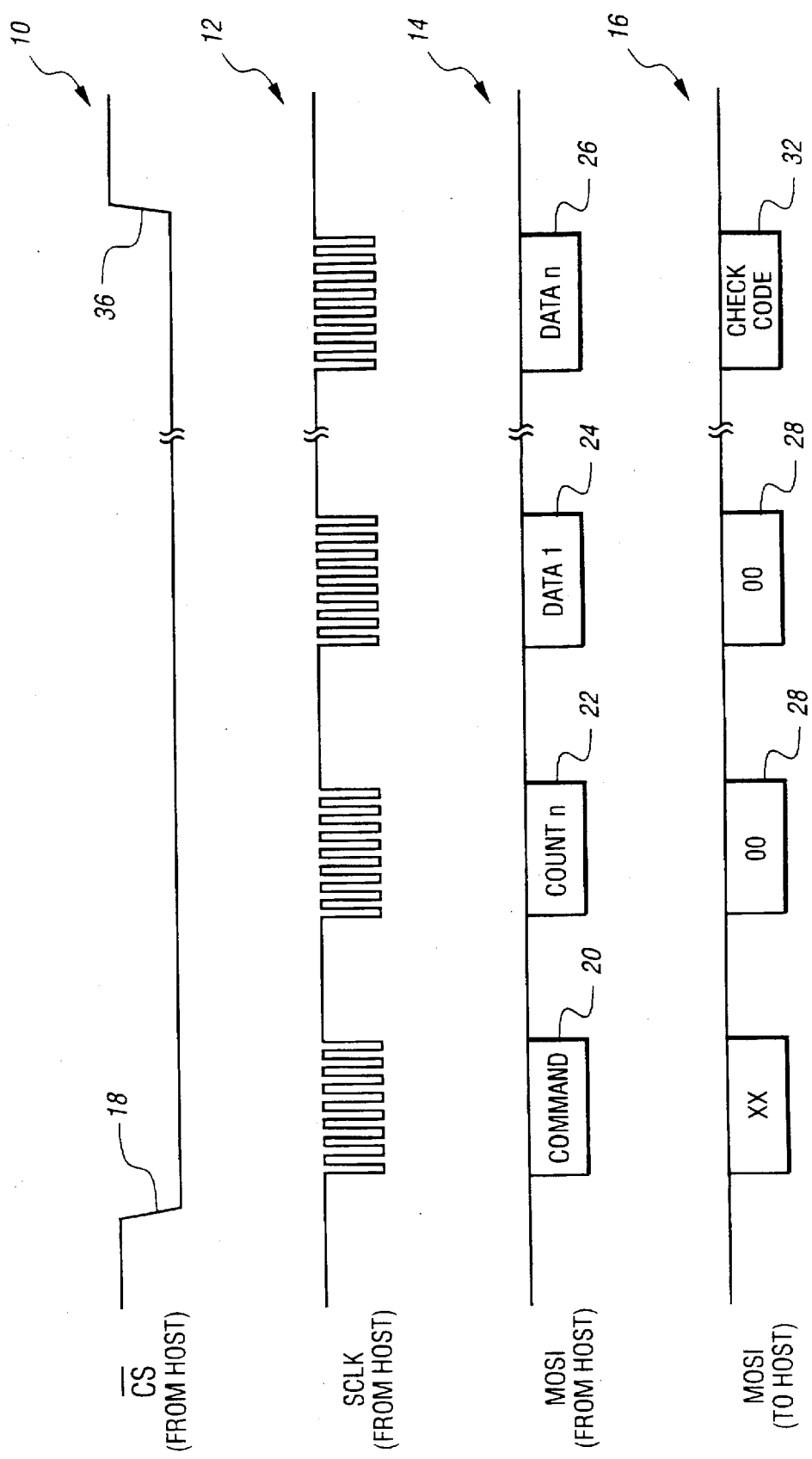
FIG. 1 illustrates an integrity check operation according to the method and system of the present invention indicating a successful data transfer.

With reference to FIGS. 1–4, the preferred embodiment of the method and system of the present invention will now be described. Referring first to FIG. 1, an integrity check operation according to the method and system of the present invention indicating a successful data transfer between a host and a peripheral is shown. As seen therein, a number of host/peripheral interface signal lines are depicted over time including a chip select (CS) line (10) from the host to the peripheral, a serial clock (SCLK) line (12) originating from the host, a unidirectional data (MOSI) line (14) from the host to the peripheral, and a unidirectional data (MISO) line (16) from the peripheral to the host. This represents a typical SPI interface.

As seen therein, a transaction is initiated by a falling edge (18) of CS (10). The host microprocessor then sends to the peripheral device a command code byte (20), followed by a count data byte (22) indicating the number of data bytes in the transaction (n), and therefore the number of data bytes to follow (1 to n). The host then sends to the peripheral the actual data (24, 26) bytes themselves. During the transfer the peripheral device is also sending data bytes (28) back to the microprocessor in full duplex fashion, keeping track of the number of remaining bytes in the transaction. Such data bytes (28) transmitted from the peripheral to the microprocessor preferably have a value of zero. As is described in greater detail below, however, other values may also be used. As is also described in greater detail below, any such value represents an "invalid" check code.

While the peripheral device is receiving the actual data byte (26) which according to the count byte (22) (previously sent by the host microprocessor) is the expected last data byte (n), it returns a check code byte (32) to the host. That is, as is described in greater detail below, the host returns a byte (32) having a value representing a "valid" check code. In the preferred embodiment, such a valid check code is a fixed hexadecimal value of 1B, although other values may be employed.

It can thus be seen that all data bytes (28, 32) transmitted from the peripheral to the host may be referred to as "check code" data bytes, where the contents of such bytes represent either the valid check code (32), or an invalid check code (28). As a result, with the exception of the value used for the contents of the byte (32) representing the valid check code, any value may be used for the contents of the bytes (28) representing an invalid check code. It should also be noted that the valid check code, while predetermined, need not be fixed or constant. That is, the valid check code could alternatively be a generic "check sum" well known in the art predetermined based on previous data from the host (i.e., any or all data transmitted from the host to the peripheral prior to transmission of the valid check code from the peripheral to the host).

The data transaction is terminated with the rising edge (36) of CS (10). On completion of the transaction, the host microprocessor examines the last data byte (30) received from the peripheral, which was sent to the host, in full duplex fashion, substantially simultaneously to transmission of the actual last data byte (26) from the host to the peripheral. Since the value of the last data byte (30) from the peripheral (hexadecimal 1B) matches the value of the check code, the accuracy of the transaction has been verified.

Figure 2:
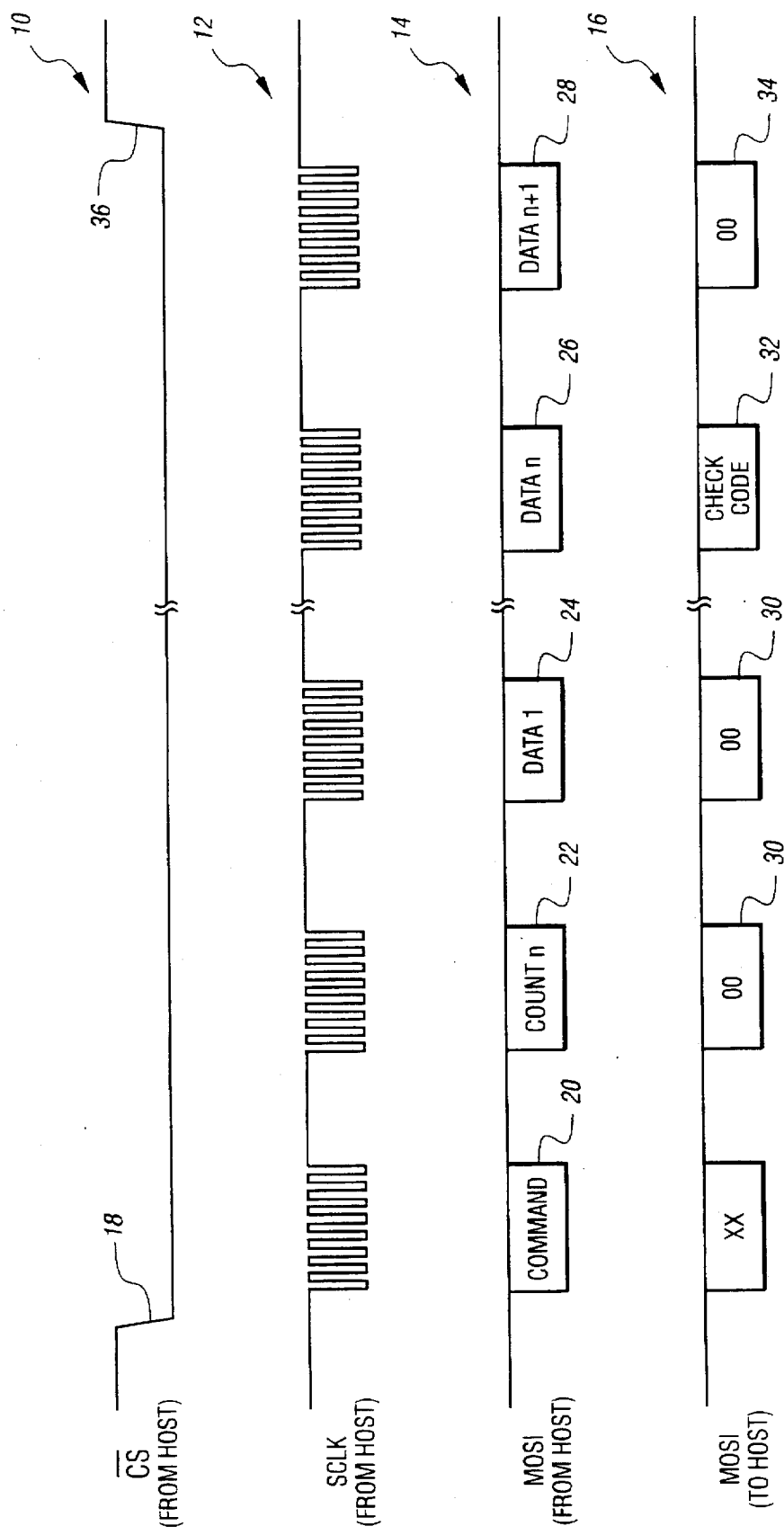
FIG. 2 illustrates an integrity check operation according to the method and system of the present invention indicating an unsuccessful data transfer.

Referring next to FIG. 2, an integrity check operation according to the method and system of the present invention indicating an unsuccessful data transfer between a host and a peripheral is shown. As seen therein, a number of host/peripheral interface signal lines are once again depicted over time including a chip select (CS) line (10) from the host to the peripheral, a serial clock (SCLK) line (12) originating from the host, a unidirectional data (MOSI) line (14) from the host to the peripheral, and a unidirectional data (MISO) line (16) from the peripheral to the host. This again represents a typical SPI interface.

Once again, a transaction is initiated by a falling edge (18) of CS (10). The host microprocessor then sends to the peripheral device a command code byte (20), followed by a count data byte (22) indicating the number of data bytes in the transaction (n), and therefore the number of data bytes to follow (1 to n). The host then sends to the peripheral the actual data (24, 26, 28) bytes themselves. During the transfer the peripheral device is also sending data bytes (30) back to the microprocessor in full duplex fashion, keeping track of the number of remaining bytes in the transaction. Such data bytes (28) transmitted from the peripheral to the microprocessor preferably have a value of zero, although other values may be employed. Once again, any such value represents an invalid check code.

While the peripheral device is receiving the actual data byte (26) which according to the count byte (22) (previously sent by the host microprocessor) is the expected last data byte (n), it returns a check code byte (32) to the host. That is, the host returns a byte (32) having a value representing a "valid" check code. Once again, the check code preferably has a fixed hexadecimal value of 1B, although other values may be employed.

Significantly, however, due to corruption of the data transfer, at least one additional actual data byte (n+1) (28) is sent from the host after the actual data byte (n) (26) which according to the count byte (22) was the expected last data byte. Substantially simultaneously, in full duplex fashion, the peripheral sends another data byte (34) to the host. Once again, such a data byte (34) transmitted from the peripheral to the host is typically zero, which represents an invalid check code.

While specifically described herein as a data byte (28), it should be noted that any type of "signal" could be transmitted from the host after transmission of the data byte (26) which was the expected last data byte. Indeed, such a "signal" is most likely to be some sort of noise "glitch" caused by the operating environment of the host and peripheral, such as an automobile. Moreover, while not shown in FIG. 2, such a "signal" may also be transmitted from the host prior to transmission of check code byte (32) from the peripheral. The method and system of the present invention are designed to recognize either case as a data transmission error.

The data transaction is terminated with the rising edge (36) of CS (10). On completion of the transaction, the host microprocessor examines the last data byte (34) received from the peripheral, which was sent to the host, in full duplex fashion, substantially simultaneously to transmission of the actual last data byte (28) from the host to the peripheral. Since the value of the last data byte (34) from the peripheral (zero) does not match the value of the check code (hexadecimal 1B), the transaction is determined to have been corrupted. In that event, the host microprocessor may attempt to reissue the transaction.

Once again, it can be seen that all data bytes (30, 32, 34) transmitted from the peripheral to the host may be referred to as "check code" data bytes, where the contents of such bytes represent either the valid check code (32), or an invalid check code (30, 34). As a result, with the exception of the value used for the contents of the byte (32) representing the valid check code, any value may be used for the contents of the bytes (30, 34) representing an invalid check code.

As is readily apparent from the foregoing description, since a "check code" byte [(32)—FIG. 1; (34)—FIG. 2] is returned in full duplex fashion from the peripheral substantially coincidentally with transmission from the host of the actual last data byte [(26)—FIG. 1; (28)—FIG. 2] in the transaction, no extra bandwidth is required. Moreover, the initiator of the transaction (the host microprocessor) has instantaneous feedback concerning success of the transmission by examining the last byte returned by the peripheral.

Still further, the peripheral also knows if the transaction was successful by verifying that the transaction was completed on the correct check code location as determined by the data count byte (22) sent by the host microprocessor at the start of the transaction. That is, the last byte transmitted from the host to the peripheral must correspond to transmission of the valid check code from the peripheral to the host for the transaction to be verified.

In addition, where the transaction involving instructions transmitted from the host to the peripheral was corrupted, the peripheral knows to refrain from executing such instructions. Indeed, in that instance, the instructions will likely be repeated to correct the data corruption error. It can thus be seen that the method and system of the present invention increase the efficiency of an integrity check of serial communications between a host and a peripheral.

Figure 3:
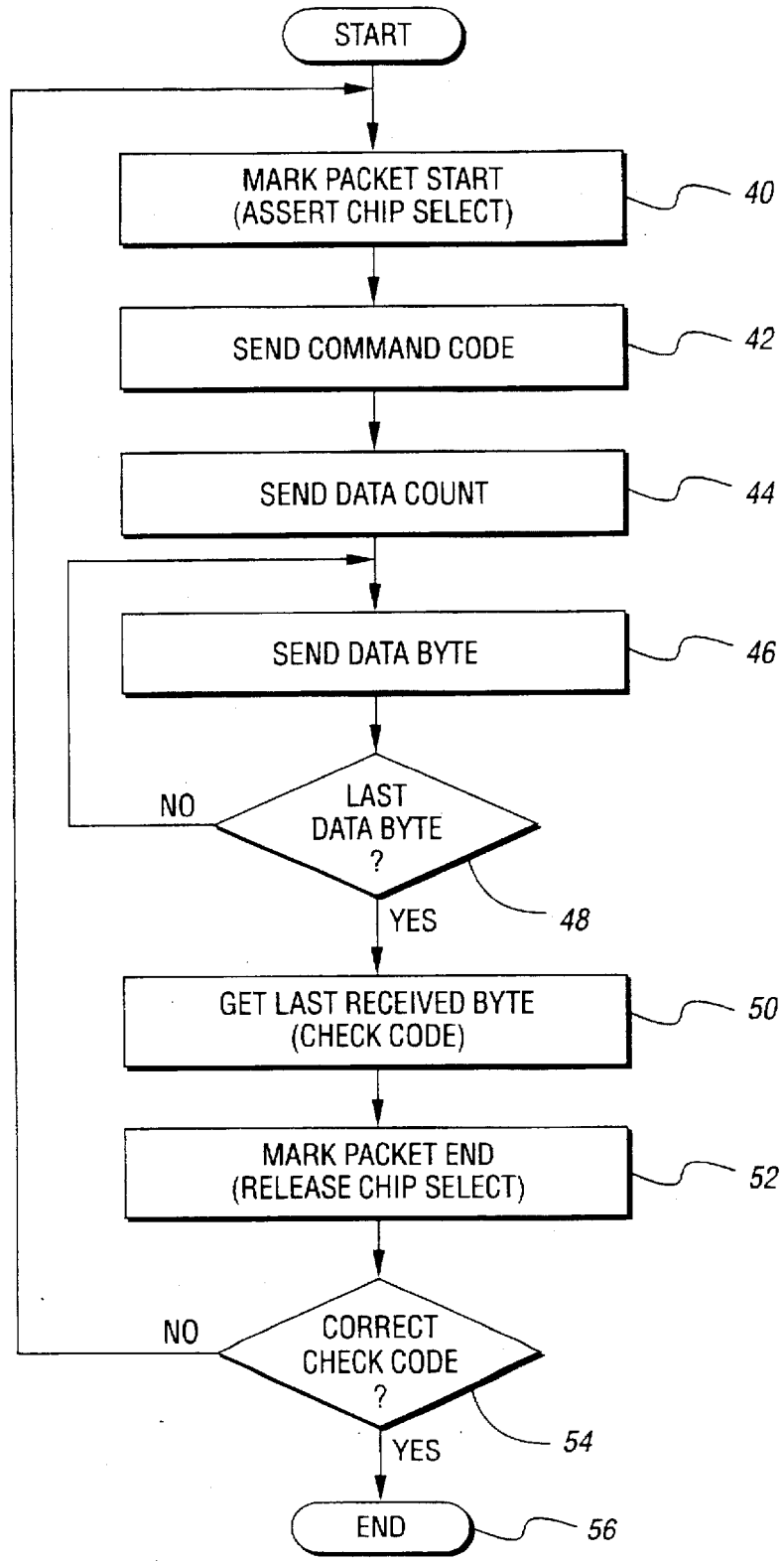
FIG. 3 illustrates a flowchart depicting the integrity check method of the present invention.

Referring next to FIG. 3 (and with continuing reference to FIGS. 1 and 2) a flowchart depicting the integrity check method of the present invention is shown. As seen therein, the data transaction is initiated (40) by marking the start of a data packet. In the preferred embodiment, this is accomplished by assertion (18) of chip select (CS) line (10). As a result, the command code byte (20) and the data count byte (22) are sent (42, 44) from the host microcontroller to the peripheral.

Thereafter, actual data bytes (24, 26, 28) are individually sent (46) from the host to the peripheral. At each such transmission, it is determined (48) if the actual data byte (24, 26, 28) being sent is the last data byte (26). If not, an additional actual data byte (26, 28) is sent (46) from the host to the peripheral. If so, the last data byte sent from the peripheral to the host (32, 34) is retrieved (50) by the host.

Subsequently, the data transaction is terminated (52) by marking the end of the data packet. In the preferred embodiment, this is accomplished by release (36) of chip select (CS) line (10). At that time, it is determined (54) whether the last data byte sent (32, 34) from the peripheral to the host matches the check code. If so, the data transaction has been verified as successful (56). If not, the data transaction has been corrupted, and retransmission may be undertaken (40).

Figure 4:
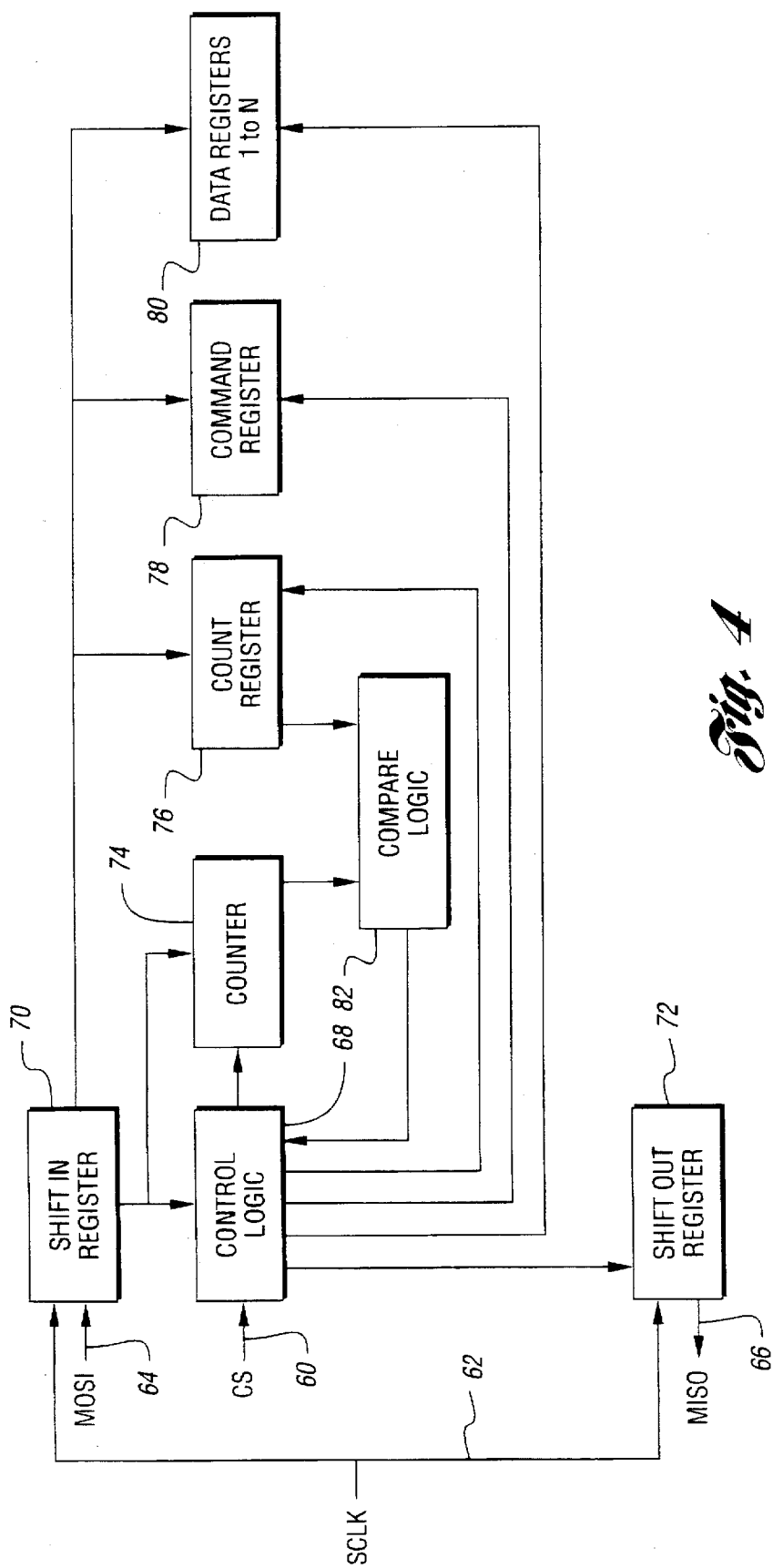
FIG. 4 illustrates a simplified block diagram of the integrity check system of the present invention.

Referring finally to FIG. 4, a simplified block diagram of the integrity check system of the present invention is shown. As seen therein, the serial peripheral interface comprises a four line system which includes a chip select (CS) line (60) from the host to the peripheral, a serial clock (SCLK) line (62) originating from the host, a unidirectional data line (MOSI) (64) from the host to the peripheral, and a unidirectional data line (MISO) (66) from the peripheral to the host. Once again, this portion of the system represents a typical SPI.

CS line (60) is provided in communication with control logic (68). SCLK line (62) is provided in communication with both a shift-in register (70) and a shift-out register (72). Control logic (68) is itself provided in communication with shift-in register (70), shift-out register (72), a counter (74), a count register (76), a command register (78), and a plurality of data registers (1 to N) (80). Counter (74) and count register (76) are both provided in communication with compare logic (82), which is itself provided in communication with control logic (68). As those of ordinary skill in the art will recognize, these elements provide the means for performing the method of the present invention detailed herein.

Still referring to FIG. 4, a data transaction between the host and the peripheral starts when control logic (68) detects the falling edge of a signal from CS (60). In that event, control logic (68) directs the shift-out register (72) to output an invalid check code. As previously described, such an invalid check code is preferably zero.

As described above with respect to FIGS. 1–3, the first data byte received by the peripheral from the host is a command data byte. As a result, after the shift-in register (70) has received the first data byte, control logic (68) directs command register (78) to latch that data byte therein.

As also previously described with respect to FIGS. 1–3, the second data byte received by the peripheral from the host is the data count byte. As a result, after the shift-in register (70) has received the second data byte, control logic (68) directs count register (76) to latch that data byte therein. In addition, counter (74) is reset to a count of one.

Thereafter, subsequent data bytes are placed by control logic (68) in appropriate data registers (80). Control logic (68) also increments counter (74) after receipt of each such data byte in order to track the number of data bytes received.

After receipt of each such data byte, compare logic (82) compares the value of counter (74) and the contents of count register (76). Upon identifying a match, compare logic (82) signals control logic (68), which directs shift-out register (72) to transmit the valid check code. As previously described, such a valid check code is preferably a value of hexadecimal 1B. Control logic (68) then directs shift-out register (72) to transmit an invalid check code thereafter. Once again, such an invalid check code is preferably zero.

Upon receipt of the rising edge of the signal from CS (60), control logic (68) terminates the data transaction. As previously described, if this occurs on an incorrect data location (i.e., the valid check code was not the last data byte transmitted by the peripheral to the host), control logic (68) directs the peripheral to ignore the command.

At the same time, the host compares the content of the last data byte received from the shift-out register (72) (i.e., the data byte received immediately preceding termination of the data transaction). If those contents do not have a value matching the value of the valid check code, the host knows that the data transaction has been corrupted. In that event, the host may reissue the transaction.

As is readily apparent from the foregoing description, then, the present invention provides an improved method and system for checking the integrity of multi-byte serial data transfers between a host device and a peripheral device, thereby improving the overall efficiency of such transfers. More specifically, the present invention provides for immediate recognition of a data transfer error, as well as for identification of the specific data transfer that must be reissued to correct that error, while avoiding extra overhead in the transaction in the form of wasted bandwidth. While such data transfers have been described in the preferred embodiment as bytes, those of ordinary skill in the art will recognize that the method and system of the present invention are suitable for use with serial data transfers of any type or size (i.e., "word").

It is to be understood that the present invention has been described in an illustrative manner, and that the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described.

What is claimed is:

1. A method for checking the integrity of a full duplex multi-word serial transfer between first and second devices, the transfer including an actual last word, the method comprising:

(a) transmitting a count word from the first device to the second device, the count word indicating a number of words to be transmitted including an expected last word;

(b) transmitting the actual last word from the first device to the second device;

(c) transmitting, substantially simultaneously to (b), a check code word from the second device to the first device, the check code word having a selected value if the actual last word is the expected last word, and another value otherwise;

(d) comparing the value of the check code word to a predetermined value; and (e) determining, at the first device, a transfer error if the value of the check code word fails to match the predetermined value.

2. The method of claim 1 further comprising:

(f) transmitting, prior to (b), a word from the first device to the second device; and (g) transmitting, substantially simultaneously to (f), a check code word from the second device to the first device, the check code word having a selected value if the word is the expected last word, and another value otherwise;

wherein the selected value of the check code word is based on the word transmitted.

3. The method of claim 1 further comprising terminating the serial transfer prior to (d).

4. The method of claim 3 wherein the selected value of the check code word is predetermined.

5. The method of claim 4 wherein the another value of the check code word is any value other than the selected value.

6. The method of claim 1 further comprising repeating the serial transfer if a transfer error is determined.

7. A method for checking the integrity of a full duplex multi-word serial transfer between first and second devices, the transfer including an actual last word, the method comprising:

(a) transmitting a count word from the first device to the second device, the count word indicating a number of words to be transmitted including an expected last word;

(b) transmitting the actual last word from the first device to the second device;

(c) transmitting, substantially simultaneously to (b), a check code word from the second device to the first device, the check code word having a selected value if the actual last word is the expected last word, and another value otherwise; and (d) determining a transfer error if the value of the check code word is other than the selected value.

8. The method of claim 7 further comprising:

(e) transmitting, prior to (b), a word from the first device to the second device; and (f) transmitting, substantially simultaneously to (e), a check code word from the second device to the first device, the check code word having a selected value if the word is the expected last word, and another value otherwise;

wherein the selected value of the check code word is based on the word transmitted.

9. The method of claim 7 wherein determining a transfer error comprises comparing the value of the check code word to a predetermined value.

10. The method of claim 9 wherein the selected value of the check code word is predetermined.

11. The method of claim 10 wherein the another value of the check code word is any value other than the selected value.

12. The method of claim 7 further comprising:

(e) transmitting, prior to (a), a command word from the first device to the second device, the command word representing a command to be executed by the second device; and (f) disregarding the command represented by the command word if a transfer error is determined.

13. The method of claim 12 further comprising repeating the serial transfer if a transfer error is determined.

14. A system for checking the integrity of a full duplex multi-word serial transfer between first and second devices, the transfer including an actual last word, the system comprising:

means for transmitting a count word from the first device to the second device, the count word indicating a number of words to be transmitted including an expected last word;

means for transmitting the actual last word from the first device to the second device;

means for transmitting, substantially simultaneously to transmission of the actual last word, a check code word from the second device to the first device, the check code word having a selected value if the actual last word is the expected last word, and another value otherwise; and means for determining a transfer error if the value of the check code is other than the selected value.

15. The system of claim 14 further comprising:

means for transmitting, prior to transmission of the actual last word, a word from the first device to the second device; and means for transmitting, substantially simultaneously to transmission of the word, a check code word from the second device to the first device, the check code word having a selected value if the word is the expected last word, and another value otherwise;

wherein the selected value of the check code word is based on the word transmitted.

16. The system of claim 14 wherein the means for determining a transfer error comprises means for comparing the value of the check code word to a predetermined value.

17. The system of claim 16 wherein the selected value of the check code word is predetermined.

18. The system of claim 17 wherein the another value of the check code word is any value other than the selected value.

19. The system of claim 14 further comprising:

means for transmitting, prior to transmission of the count word, a command word from the first device to the second device, the command word representing a command to be executed by the second device; and means for disregarding the command represented by the command word if a transfer error is determined.

20. The system of claim 19 further comprising means for repeating the serial transfer if a transfer error is determined.

* * * * *